Figure 1:
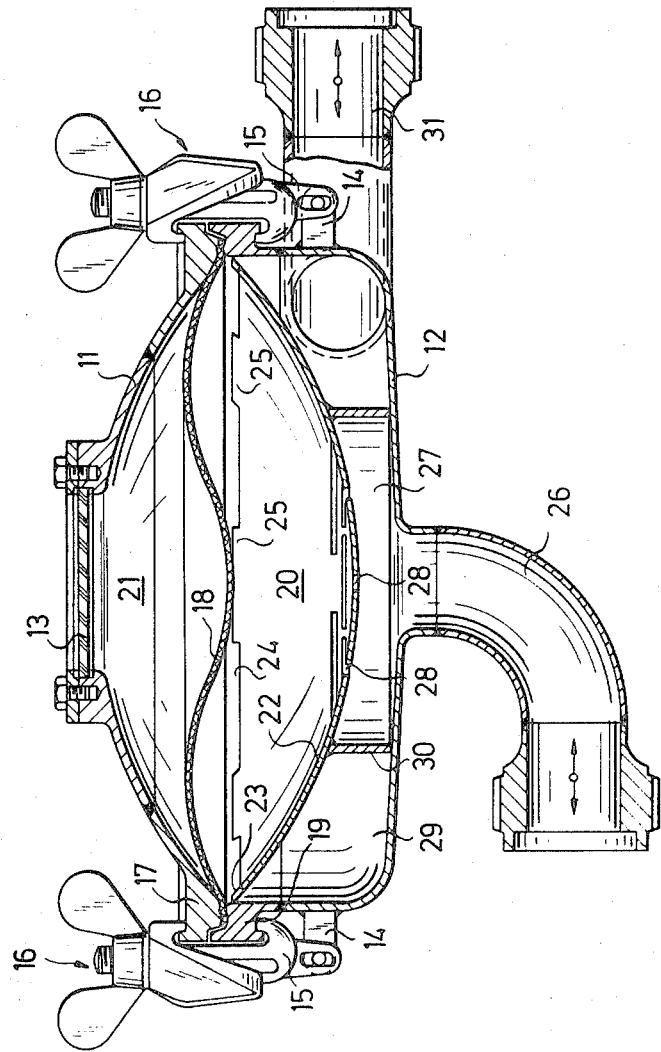

United States Patent

[11] 3,628,573

| [72] | Inventors | Willi Loliger;<br>Rudolf Schmied, both of Konofingen,<br>Switzerland |
|---|---|---|
| [21] | Appl. No. | 56,897 |
| [22] | Filed | July 21, 1970 |
| [45] | Patented | Dec. 21, 1971 |
| [73] | Assignee | Alpura AG<br>Bern, Switzerland |

[54] DIAPHRAGM CHAMBER-DAMPING DEVICE FOR DAMPING FLUID SHOCKS IN PIPE SYSTEMS
8 Claims, 2 Drawing Figs.

[52] U.S. Cl..................................................... 138/30, 137/593
[51] Int. Cl...................................................... F16l 55/04
[50] Field of Search............................................ 138/30, 26; 92/134; 137/593

[56] References Cited
UNITED STATES PATENTS

| 2,563,257 | 8/1951 | Loukonen..................... | 138/30 |
| 2,345,475 | 3/1944 | Herman et al................ | 138/30 |

FOREIGN PATENTS

| 751,895 | 7/1956 | Great Britain................ | 138/30 |

*Primary Examiner*—Samuel B. Rothberg
*Attorney*—Kenyon & Kenyon Reilly Carr & Chapin ABSTRACT: The diaphragm chamber-damping device has a dished shell below the diaphragm which cooperates with a separating wall to form a pair of chambers within the liquid compartment while providing for a flow of fluid between the two chambers. One chamber communicates with an inlet pipe while the other chamber communicates with an outlet pipe so that fluid can be passed through the device.

DIAPHRAGM CHAMBER-DAMPING DEVICE FOR DAMPING FLUID SHOCKS IN PIPE SYSTEMS

This invention relates to a diaphragm chamber damping device for damping fluid shocks in pipe systems, and particularly, in sterilizable pipe systems.

Sterilizable pipe systems, for example, through which milk flows in milk-degerminating equipment, generally are subjected to successive mediums of greatly varying temperature in an initial sterilization treatment. For example, the pipe system can be flushed with hot water, then with a cold sterilizing medium, followed by a rinsing medium and, finally, with steam. It is thus possible, due to the successive passages of these mediums of different temperatures, and on occasion of different states, for intense shocks to occur in the pipe which may cause derangement or damage to the pipe system. These shocks can further occur more frequently when the pipe system forms a part of a degerminating apparatus for liquids in which the liquid is heated for a brief period under the direct introduction of heating steam to a high temperature, for example 150° C., and then becomes cooled through a sudden decompression. Further, in some instances, the milk cooler which usually follows a homogenization pump in such milk-degerminating apparatus can become damaged by the fluid shocks.

Consequently, it has been known to install damping elements in the pressure line of the pumps and, on occasion, in the suction lines of these above pipe systems in order to damp any fluid shocks that may occur. In some instances, air vessels or the like have been used as the damping element. However, these elements have generally not been satisfactory because they have not been accessible for a reliable initial sterilization and have further been difficult to keep clean.

Accordingly, it is an object of the invention to provide a damping device which is reliable in operation.

It is another object of the invention to provide a damping device which is simple to clean.

It is another object of the invention to provide a damping device which is capable of a reliable initial sterilization.

Briefly, the invention provides a diaphragm chamber damping device which is capable of damping fluid shocks that may occur in a pipe system. The device includes a housing which is divided approximately in half, a diaphragm which is disposed between the housing halves to divide the interior of the housing into a liquid compartment and a gas compartment and a shell-like wall which is mounted in the liquid compartment to further divide the liquid compartment into two chambers. The shell-like wall is provided with a rim which extends into the region where the housing halves are secured together and which is formed to provide a passage through which liquid can flow from one side of the shell-like wall to the other side. In addition, the damping device is provided with a means to separate the chamber located between the shell-like wall and housing into two chambers as well as with liquid connection elements which communicate each of these chambers with the exterior of the damping device. In order to permit a flow of fluid between these latter two chambers, the shell-like wall is formed with openings to communicate one of the chambers with the opposite side of the shell-like wall and, thus, via the passage at the rim of the shell-like wall with the other of the chambers.

In one embodiment, the means which cooperates with the shell-like wall to form the two chambers is a tubular wall so that one chamber is centrally located within the liquid compartment while the other is concentrically disposed outside the central chamber. In addition, the liquid connection element connected to the outer chamber is connected in tangential relation to the chamber so that dead corners are avoided during a flow-through of a liquid or vaporous sterilizing medium.

The damping device also includes a means for monitoring the condition of the diaphragm in order to permit the immediate detection of a leak in the diaphragm since any leak would endanger the sterility of the system.

Figure 2:
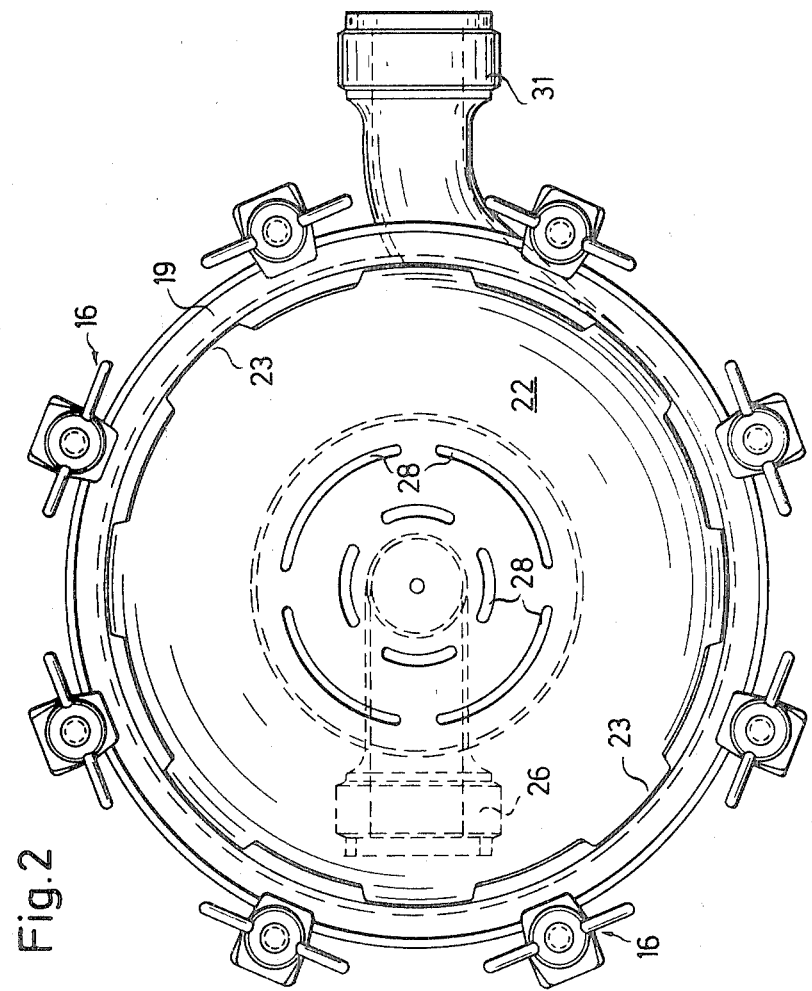

These and other objects and advantages of the invention will become more apparent from the following detailed description and appended claims taken in conjunction with the accompanying drawings in which:

FIG. 1 illustrates a cross-sectional view of a damping device according to the invention; and FIG. 2 illustrates a plan view of the damping device of FIG. 1.

Referring to FIG. 1, the damping device has a housing formed of two halves 11, 12 which are secured together about respective peripheral flanges 17, 19 by means of suitable closure devices 16. Each closure device 16 has an arm 15 which is pivotally mounted on an arm 14 secured, as by welding, to the lower housing half 12 so as to allow the closure device 16 to pivot into bearing engagement against the flange 17 of the upper housing half 11. In addition, a diaphragm 18 is clamped between the flanges 17, 19 of the housing halves 11, 12 to divide the interior of the housing into a lower liquid compartment 20 and an upper gas compartment 21 which is filled with air or other suitable gas.

Referring to FIGS. 1 and 2, the liquid compartment 20 is subdivided by a shell-like wall 22 of dished shape which has a rim 23 extending into the area of the flanges 17, 19 and which is formed with toothlike appendages 25 at the rim so as to leave an unobstructed passage 24 in the form of an annular gap between the wall 22 and housing half 12. The appendages 25 further serve to center the shell 22 while permitting periodic increases and decreases in the peripheral direction of the annular gap.

Referring to FIG. 1, the lower housing half 12 also has a tubular wall 30 which extends between the base of the lower housing 12 and the bottom surface of the shell-like wall 22 in order to divide the space below the wall 22 into a central chamber 27 and a surrounding concentric chamber 29. The central chamber 27 is placed in communication with the space on the opposite side of the shell-like wall 22 by means of elongated passageways 28 in the wall 22 and with a tubular connecting element 26 which serves either as an inlet or outlet depending on the flow direction of a liquid passing through the damping device. In addition, the outer chamber 29 is placed in communication with a tubular connecting element 31 which is connected in tangential relation to the chamber 29 and serves as an outlet or inlet for the liquid passing through the damping device. These chambers 27, 29 thus communicate with each other via the annular gap 24 formed by the shell-like wall 22 and housing half 12.

The upper housing half 11 is further in the form of a skullcap and is provided with a monitoring means in the form of an inspection window 13 so that the condition of the diaphragm can be inspected.

In operation, with the respective connecting elements 26, 31 connected to a pipe system e.g., in a milk-degermination apparatus, fluid can be passed through the damping device from either direction; however in either direction of flow, no spaces are allowed to exist in the liquid compartment 20 or the chambers 27, 29 where poor flow occurs. In this respect, the shell-like wall 22 guides the flow so as to prevent such spaces from occurring while at the same time the wall ensures an intense flow of a sterilizing medium having a thermal action or thermal-chemical action against the flange 19 during an initial sterilization of the device. The flange 19 is heated in each case by means of the intense impact of the flow practically to the temperature of the inflowing medium so as to ensure a reliable initial sterilization in this region.

The gas compartment 21 can be filled with a gas at a pressure higher than atmospheric. Thus, when the liquid compartment 20 is discharged, the diaphragm can collapse upon the shell-like wall 22. As the wall 22 will act as a support wall for the diaphragm, damage to the diaphragm 18 will be avoided especially in the event of a pressure failure on the liquid side.

The invention thus provides a damping device which is simple to disassemble and reassemble. Also, the device is of a shape, as shown, which of itself practically excludes a settling of solid substances carried along with the liquid. Further, because of these features, the damping device can be easily cleaned. As a rule, the device can be cleaned without being disassembled by conducting a rinsing medium which may have a cleaning additive such as lye, acid and the like therein through the device.

What is claimed is:

1. A diaphragm chamber damping device comprising
    a housing;
    a diaphragm mounted within said housing to divide the interior of said housing into a gas compartment and a liquid compartment;
    a shell-like wall mounted in said liquid compartment, said wall having a rim adjacent said housing defining a passage between said rim and said housing and at least one passageway communicating the opposite sides of said wall with each other;
    first means communicating with said passageway to conduct a flow of fluid from one side of said wall to the opposite side; and
    second means separated from said first means and communicating with said passage to conduct a flow of fluid from said opposite side of said wall to said one side whereby a flow of fluid can be passed through said fluid compartment from one of said means to the other of said means.

2. A diaphragm chamber damping device as set forth in claim 1 wherein said housing is formed of two halves releasably secured together with said diaphragm being secured therebetween.

3. A diaphragm chamber damping device as set forth in claim 1 wherein at least one of said means includes a tubular connecting element secured to said housing in tangential relation to the interior of said housing.

4. A diaphragm chamber damping device as set forth in claim 1 which further comprises a tubular wall between said housing and said shell-like wall separating first means from said second means and supporting said shell-like wall in said housing.

5. A diaphragm chamber damping device as set forth in claim 4 wherein said first means includes a central chamber within said tubular wall and communicating with said passageway in said shell-like wall and said second means includes a chamber concentrically surrounding said central chamber and communicating with said passage.

6. A diaphragm chamber damping device as set forth in claim 1 which further comprises means for monitoring the condition of said diaphragm.

7. A diaphragm chamber damping device as set forth in claim 6 wherein said monitoring means is a window in said housing for viewing of said diaphragm therethrough.

8. A diaphragm chamber damping device as set forth in claim 7 wherein said wall is formed as a support wall for said diaphragm in the event of a discharge of liquid from said liquid compartment.

* * * * *